United States Statutory Invention Registration [19]

[11] Reg. Number: H57

Gabriel et al. [45] Published: May 6, 1986

[54] PARTIALLY ADAPTIVE ARRAY USING BOOTLACE LENS

[75] Inventors: William F. Gabriel, Annandale; James K. Hsiao, Vienna, both of Va.

[73] Assignee: The Government of the United States, Washington, D.C.

[21] Appl. No.: 786,569

[22] Filed: Oct. 11, 1985

[51] Int. Cl.[4] ..... H01Q 3/34

[52] U.S. Cl. ..... 343/376; 343/18 E; 343/372; 343/384

*Primary Examiner*—Theodore M. Blum
*Assistant Examiner*—Bernarr Earl Gregory
*Attorney, Agent, or Firm*—Robert F. Beers; William T. Ellis; Ansel M. Schwartz

[57] ABSTRACT

A partially adaptive array which compensates for jamming. The array is comprised of more than 1000 elements and uses a bootlace lens to form a family of beams from which an adaptive array chooses at least one beam of the family of beams that most closely represents the jamming, and subtracts the beam from a main beam. In this way jamming of the beam is compensated for.

4 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PARTIALLY ADAPTIVE ARRAY USING BOOTLACE LENS

BACKGROUND OF THE INVENTION

The present invention relates to partially adaptive arrays. More specifically, the present invention relates to partially adaptive arrays of greater than 1000 elements that use a bootlace lens.

A fully adaptive array is one in which every element of the array is individually controlled adaptively. An adaptive array is one of the best available means to reject unwanted noise and interferences and is ideal for the purpose of removing jamming. However, in practice, due to the complexity of the adaptive network, most adaptive arrays are limited to only a few elements. The ever increasing requirement of high gain and high resolution leads to large arrays with thousands of elements. To develop a fully adaptive array for such a system is neither economical nor technically feasible.

A partially adaptive array is one in which elements are controlled in groups (the subarray approach) or in which only certain elements called auxiliary elements are made controllable. A partially adapted array greatly reduces the number of adaptive processors and its complexity and hence its cost. However, performance of such a system is limited and as the number of elements increases the complexity of the system once again poses a problem.

A butler matrix has been proposed to process all the elements of a fully adaptive array. See S. P. Applebaum, P. J. Chapman, "Adaptive Arrays with Main Beam Constraints," IEEE Trans. on ANT and Prop., Vol. AP-24, No. 5, Sept 1976. However, the butler matrix may have the same problems of complexity as mentioned above if one attempts to adapt with a large number of beams (more than 1000).

SUMMARY OF THE INVENTION

Accordingly, one object of the present invention is to provide a novel partially adaptive array capable of removing jamming effects comprised of more than 1000 elements that can be efficiently processed.

Another object of the present invention is to provide a partially adaptive array capable of removing jamming effects comprised of more than 1000 elements that uses a bootlace lens.

These and other objects of the present invention are obtained with a partially adaptive array of antennae which compensates for jamming comprising more than 1000 elements of antennae with each element receiving radio frequency energy and producing a linear output proportional thereto. (The elements are being positioned in a co-planar fashion.) Means for forming a mainbeam from the output of the elements. A bootlace lens which has each antenna element connected to the bootlace lens at a predetermined position so the output from each element is supplied to the bootlace lens to form an output comprised of a family of beams. An adaptive processor which determines at least one individual beam from the family of beams, that corresponds to any jamming and a subtractor which subtracts the determined individual beam from the main beam. The adaptive processor is connected to the bootlace lens to receive the output of the bootlace lens and is also connected to the main beam in order to compensate for jamming.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
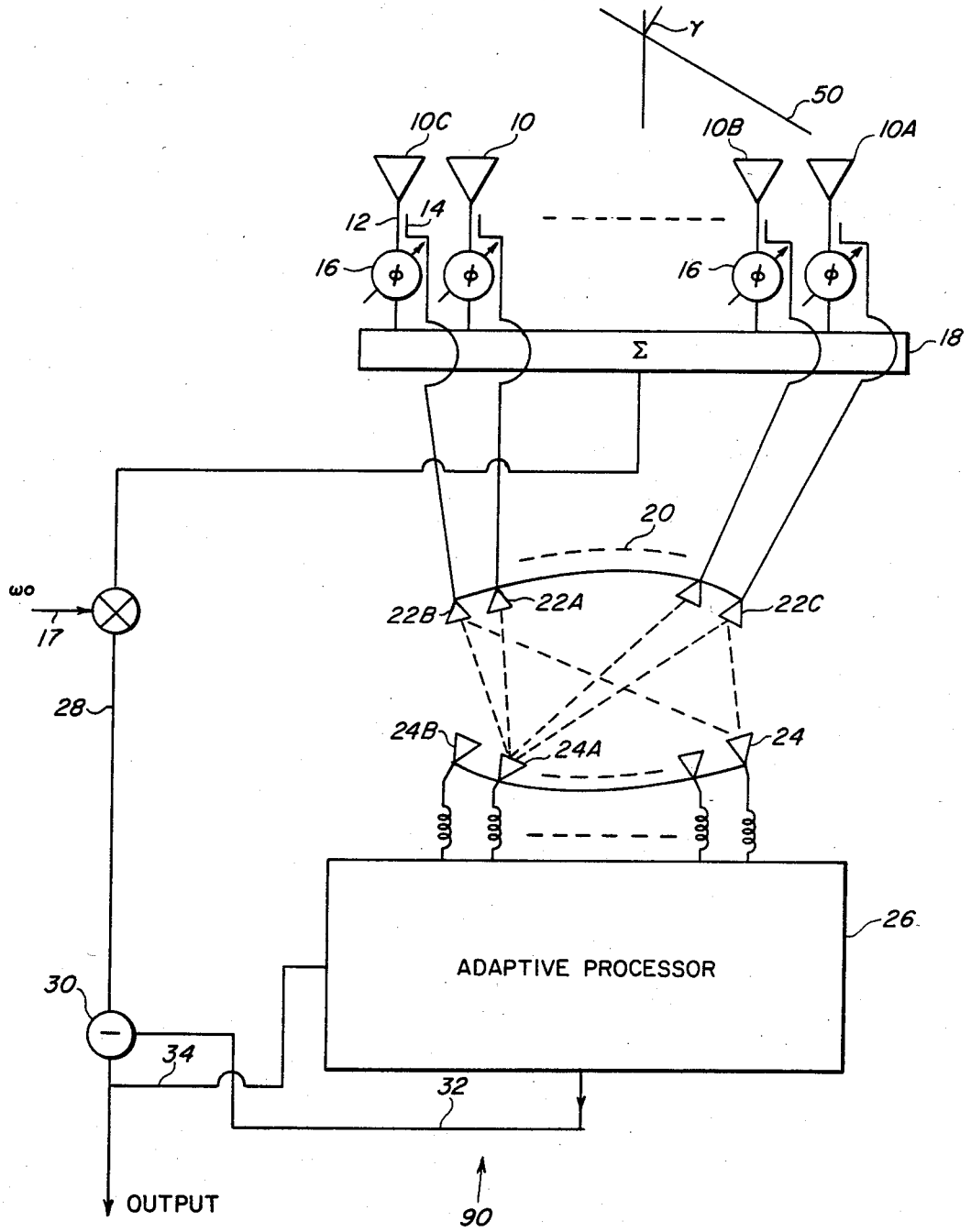
FIG. 1 is a schematic drawing of a partially adaptive array using a bootlace lens.

Referring now to the drawings, wherein like reference numerals designate identical or corresponding parts throughout the several views, and more particularly to FIG. 1 thereof, there is disclosed a partially adaptive array 90. The array 90 is comprised of elements 10 which receive radio frequency energy and produce a linear output proportional thereto. The elements 10 are positioned in a co-planar fashion. The signal from each element 10 is applied via a connection 12 to a weighting function circuit 16 that changes the output signal in amplitude, phase, or both. Each weighted signal from each element 10 is applied into a beam forming feed network 18 that forms a mainbeam 28 that is related to a direction in space relative to the array 10. The main beam signal is usually mixed with a local oscillator 17 at frequency o to translate it from radio frequency to intermediate frequency. Also attached to each element 10 is a line 14 that carries the output of each element 10 to a bootlace lens 20. Each line 14 is attached to bootlace lens 20 at a predetermined location 22.

The bootlace lens produces a family of beams through outputs 24 wherein each beam of the family of beams corresponds to a direction in space relative to the location of the array 90. The bootlace lens consists of paths that connect each bootlace lens input at a predetermined position 22 to each bootlace lens output 24. The different distances of each path allows each set of paths that connect to each output to form a main beam corresponding to a unique position in space, since the energy from all the different distance paths connected into one output will constructively interfere for only one unique position. The outputs or family of beams of the bootlace lens are fed into an adaptive processor 26. The adaptive processor determines if any jamming is occurring and if so, from what direction the jamming is coming from. The adaptive processor 26 then chooses at least one beam from the family of beams that most closely corresponds to the direction the jamming is coming from. The chosen beam is then applied to a subtractor 30 via a line 32. A second input is applied to subtractor 30 via line 28 such that feedback line 34 supplies the adaptive processor 26 with information so as to control adjustment of the beam that was chosen to compensate the main beam 28 for jamming.

In the operation of the invention a reflected radio frequency signal 50 from a target is received by a coplanar array of elements 10 which receive radio frequency energy. The elements 10 are of a type that produce a linear response, i.e., a T.V. antenna, from the received signal. The output from element 10 is carried or steered by connection 12 and multiplied by a predetermined weighting a phasing device 16. Each weighting factor 16 is determined by its distance from a pre-determined central or zero element 10, and the location that is desired to be studied. For instance, if the area to be studied is $\gamma$ degrees from vertical of the array of elements, then the weights 16 for each individual element 10 will be the value that is needed to multiply the signal received by the element 10 to add in phase with the pre-determined central or zero element to produce a main lobe only for the area being studied. If element 10A was chosen as the zero element when wavefront 50 will first strike element 10A. As wavefront 50 proceeds, it will strike element 10B at some later time, will have past element 10A, but will not have yet reached any elements to the left of 10B. In order for the signal received by element 10B to add to the signal already received by 10A, the signal of 10A must be speeded up by an amount proportional to the distance element 10B is from 10A, since the signal of 10A is "ahead" of the signal of 10B by an amount proportional to the time it takes wavefront 50 to reach element 10B after it has reached element 10A. This speeding up factor to put the signal of 10B inphase with the signal of 10A is the value that signal 10B is multiplied by in the weighting or phasing device 16.

Similarly, all elements 10 to the left of element 10B will have to be multiplied by weighting device 16 in an amount proportional to the distance the element is from 10A or the zero element. In the art, the procedure takes place in what is known as the element domain.

Only a wavefront or signal coming from the location that the array of elements 10 is focused on and the corresponding phasing devices are weighted for, will be received and processed to form a main lobe with any target information. If a wavefront or signal comes from any other location and impinges upon the array of elements 10, the signal will be processed but will form in the sidelobe region since the phasing devices 16 are not set to cause all the individual signals of the elements 10 to add in phase from any other position but the prechosen location.

Figure 2:
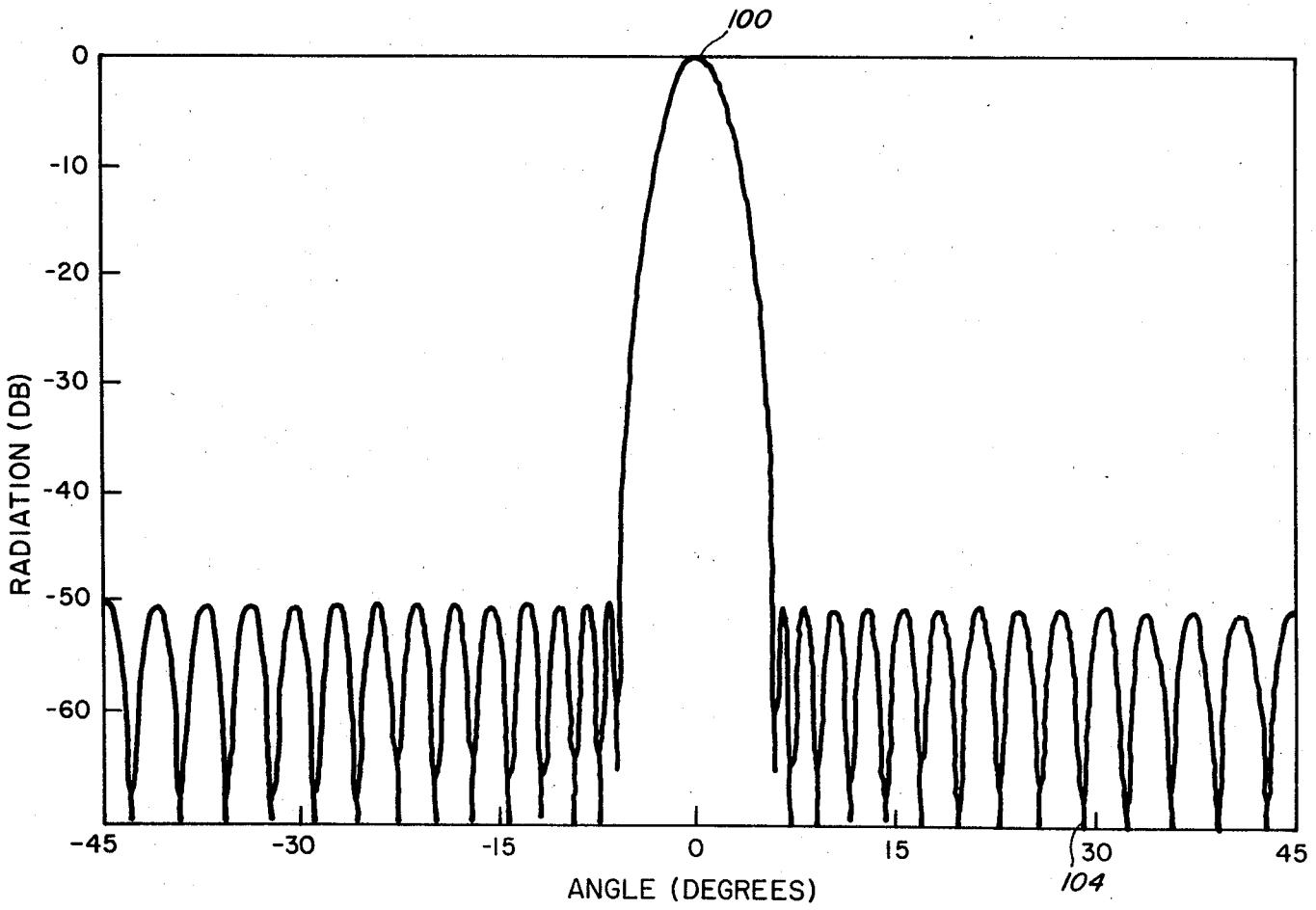
FIG. 2 is a graph representing the radiation as a function of angle of the main beam of the partially adaptive array using a bootlace.

The individual signals from elements 10 which have been processed through the phasing devices are added together by a beam form and feed network 18 to form the main beam. See Adams, Howitz and Seene, "Adaptive Main Beam Nulling for Narrow Beam Antenna Arrays," IEEE Trans. of A.E.S., Vol. AES-16, pages 509–516, July 1980 for a complete description of a beam form and feed network 18. FIG. 2 shows various radiation levels, with main beam 100 occurring at the specific location that the array of elements is steered to.

The main beam formed by the beam form and feed network 28 is then multiplied by a translation factor $\omega_o$ which turns the radio frequency signal of the beam into an IF or intermediate frequency which processing devices are more easily able to work with.

To accommodate for the effects of possible jamming, there is connected to each element 10 a line 14 in addition to connection 12, that connects the output from the respective element 10 to a bootlace lens 20. Line 14 is not weighted. This is in contrast to the connection 12, which is weighted according to the desired region that the array of elements 10 is desired to analyze. The bootlace lens receives every connection 14 that emanates from every element 10 at a predetermined location 22. Every location 22 receives only one unique line 14, and every input 22 is connected to every output 24. For instance, output 24A receives input from every input 22 of the bootlace lens 20.

Figure 3:
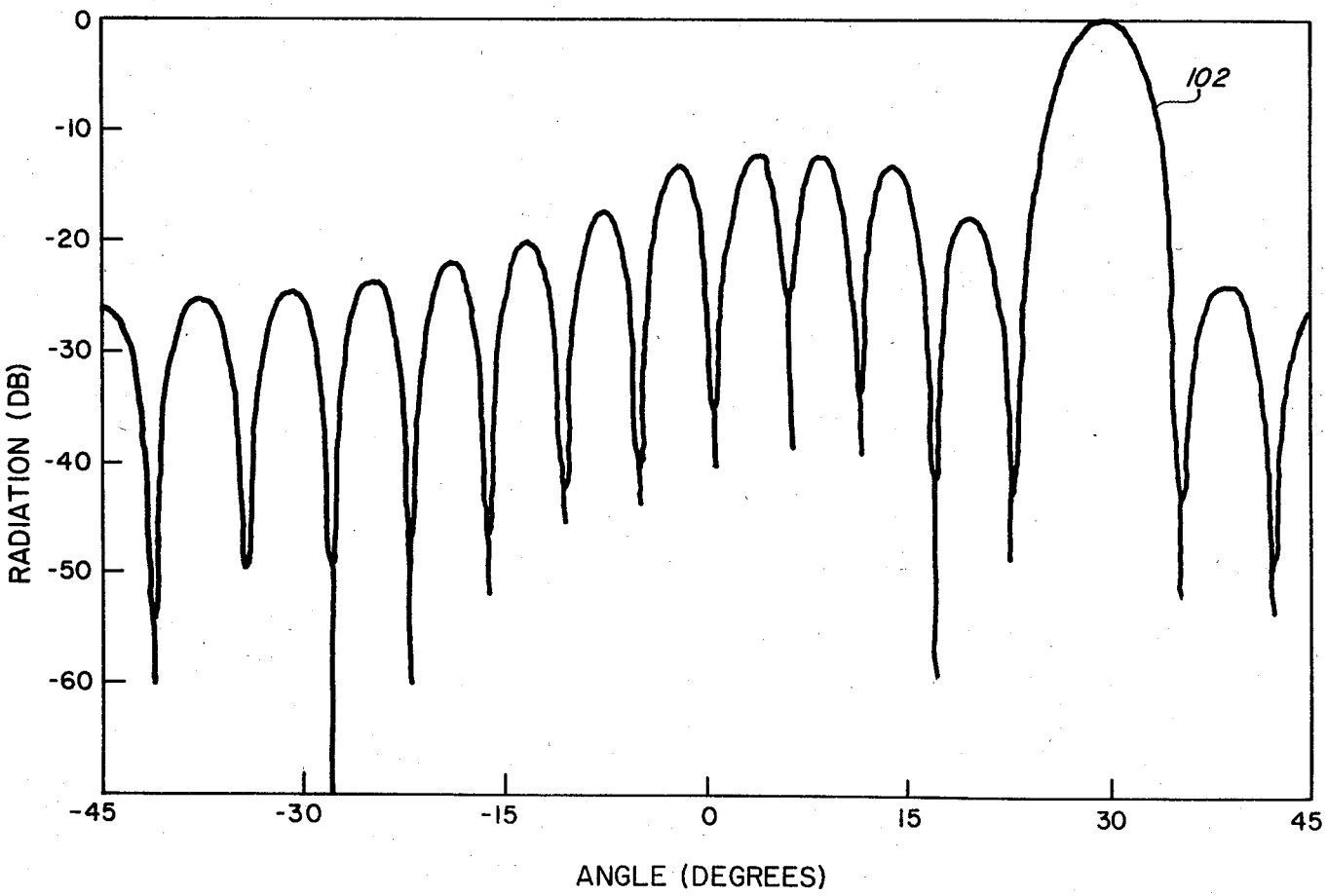
FIG. 3 is a graph representing the radiation as a function of angle from one of the beams of the bootlace lens of the partially adaptive array.

The bootlace lens outputs 24 supply information for all the space that array elements 10 are able to receive energy from. The outputs 24 of the bootlace lens 20 are essentially the main lobes for all the different regions in space that elements 10 receive energy from. This can be understood from realizing that when a wavefront 50 crosses the elements 10, some elements 10 receive the wavefront sooner than other elements, depending on the physical location of the element. By choosing the correct length of line 14, for each element 10 (line 14 being unweighted and carrying an unfiltered received signal) and connecting each unique line 14 to the correct input site 22, the phase delays caused by some elements receiving the wavefront signal later or sooner than other elements can be compensated for. This can be seen by realizing that the distance from input 22B to output 24B is less than the distance from input 22C to output 24B. So the difference in phase that is caused because wavefront 50 crosses element 10A before crossing element 10C, (since 16A is closer to 10C) can be compensated for by causing the path that the signal received by element 10A takes to output 24B to be longer than the path that the signal received by element 10C takes to output 24B. By choosing the right lengths for lines 14, the signals from elements 10A and 10C, and all the rest of the elements, will add inphase at output 24B and produce a main lobe corresponding to a specific direction in space for which the signals add inphase. Since each output 24 has different lengths from each input 22 and line 14, each output 24 will produce a main lobe corresponding to a specific direction in space from which wave energy is coming from and adding inphase at output 24. For a complete understanding of the bootlace lens and the design thereof, see J. P. Shelton, "Focusing Characteristics of Symmetrically Configurated Bootlace Lenses,"IEEE Trans. on Ant. and Prop., Vol. AP-26, No. 4, July 1978. FIG. 3 shows a graph of the output radiation of a single bootlace lense beam. Each peak 102 corresponds to radiation from a location in space that is being analyzed.

All the outputs of bootlace lens 20 feed into an adaptive processor 26. The purpose of the adaptive processor is essentially to choose the beamforming beams according to an algorithm, closest to where any jamming is coming from and subtracting only the chosen lobe or lobes that corresponds to the jamming entering the mainbeam 28 sidelobes. A subtractor circuit 30 thus removes the effects of any jamming that is occurring. The adaptive processor design is well known in the art. A complete description of a typical adaptive processor and the design thereof can be found in W. F. Gabriel, "Adaptive Arrays - An Introduction," proceedings of the IEEE, Vol. 24, No. 2, February 1976, D. J. Chapman, "Partial Adaptivity for the Large Array," IEEE Trans. on Ant. and Prop., Vol. AP-24, No. 5, September 1976.

Output 32 from the adaptive processor is fed into the subtractor 30 in order to supply the necessary beamformer signals to subtract the effects of jamming. A feedback line 34 from the output of the subtractor 30 provides the residue signal from the mainbeam to the adaptive processor 26 to insure that the effects of jamming are being compensated for. An example of jammer nulling can be seen in FIG. 2. Null 104 is a result of jamming radiation cancellation. By taking peak 102 of FIG. 3 for a beam at the jammer location and subtracting that from the mainbeam output as exhibited in FIG. 2, the null 104 is formed in the adapted mainbeam.

Obviously, numerous (additional) modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A partially adaptive array of antenna which compensates for jamming comprising:

more than 1000 elements of antenna, said elements receiving radio frequency energy and producing a linear output proportional thereto, said elements together forming a plane;

means for forming a main beam from the output of said elements;

a bootlace lens having a plurality of predetermined input positions with each of said elements connected to said bootlace lens at a predetermined position so the output from each element is supplied to said bootlace lens to form a family of beams;

an adaptive processor connected to said bootlace lens to receive said family of beams for determining whether one or more beams from said family of beams contains jamming radiation;

subtractor means connected to the main beam and the adaptive processor and receiving said jamming radiation containing beams and subtracting them from said main beam to remove the effects of jamming.

2. A partially adaptive array as described in claim 1 wherein said elements are T.V. antennae.

3. A partially adaptive array as described in claim 1 wherein said means for forming a main beam is a beam form and feed network.

4. A partially adaptive array of antennae which compensates for jamming comprising:

more than 1000 T.V. antennae, said antennae receiving radio frequency energy and producing a linear output proportional thereto, said antennae together forming a plane;

a beam form and feed network for forming a main beam from the output of said antennae;

a bootlace lens having a plurality of predetermined input positions with each of said antennae connected to said bootlace lens at a predetermined position so the output from each antenna is supplied to said bootlace lens to form a family of beams;

an adaptive processor connected to said bootlace lens to receive said family of beams for determining whether one or more beams from said family of beams contains jamming radiation; and a subtractor means connected to the main beam and the adaptive processor and receiving said jamming radiation containing beams and subtracting them from said main beams to remove the effects of jamming.

* * * * *